Patented Jan. 25, 1927.

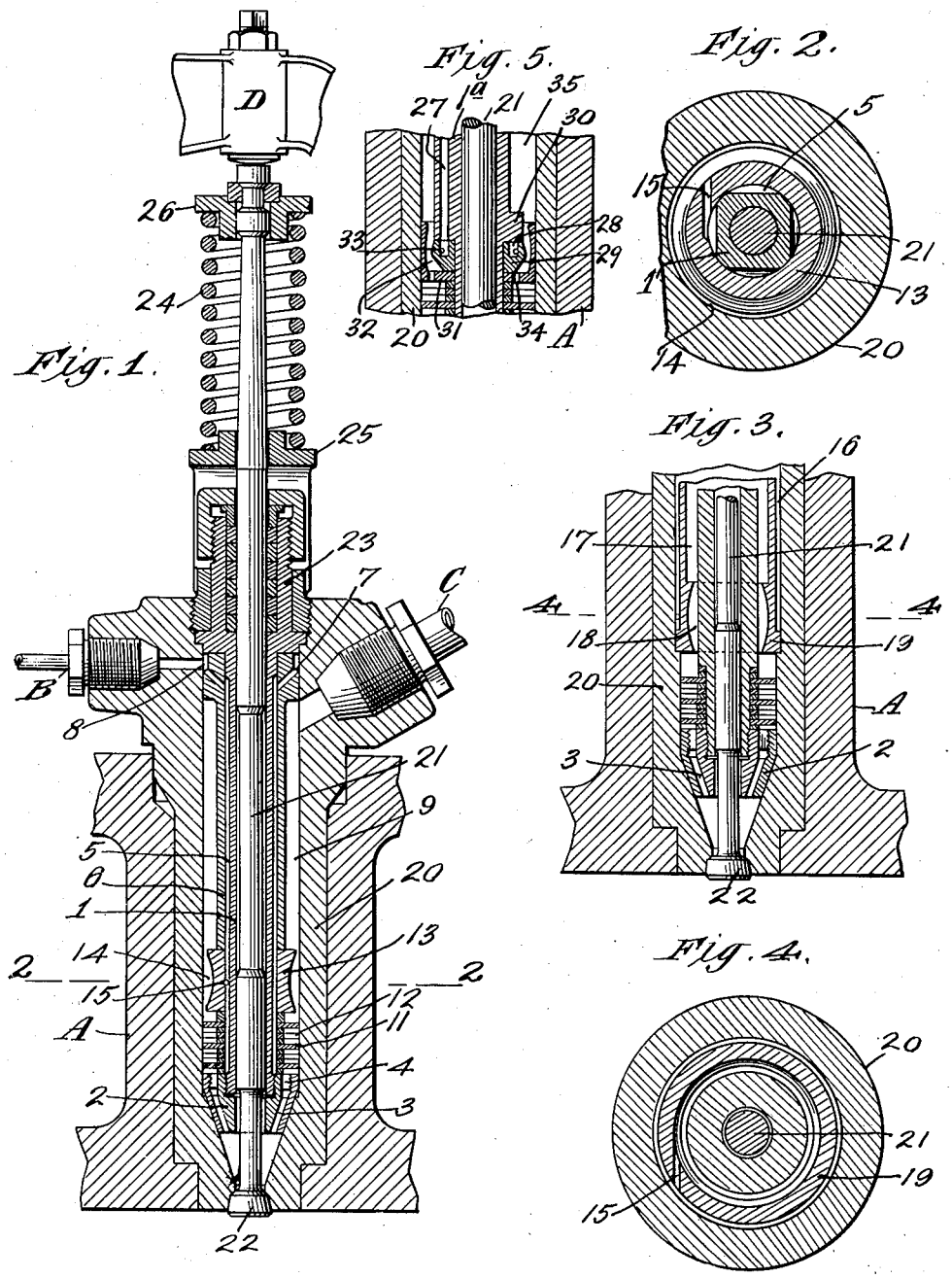

1,615,457

UNITED STATES PATENT OFFICE.

OLAV ESKIL JORGENSEN, OF FOREST HILLS, NEW YORK, ASSIGNOR TO WORTHINGTON PUMP AND MACHINERY CORPORATION, OF NEW YORK, N. Y., A CORPORATION OF VIRGINIA.

SPRAY VALVE FOR OIL ENGINES.

Application filed March 22, 1924. Serial No. 701,018.

This invention relates to improvements in spray valves for oil engines.

The especial object of the invention is to provide a more efficient and reliable spray valve of the multiple jet type, whereby a substantially uniform amount of oil will be distributed to each orifice of the multiple jet. My improved spray valve is highly efficient in all positions, as it may be effectively used with its longitudinal axis horizontal or in any inclined position, as well as in a true vertical position.

Briefly stated, the improvement includes means whereby the oil entering the spray valve casing has imparted thereto a whirling motion in a plane transverse to the longitudinal axis of such casing, so as to maintain a practically even distribution of the oil throughout an annular chamber within such casing irrespective of its longitudinal position. Pressure air, admitted as usual, will thus be applied at uniform pressure over the surface of the annular body of oil and the latter be distributed to each of the annularly arranged orifices of the multiple jet. The present arrangement also includes means for intimately commingling the air and oil in its passage to the multiple jet orifices, so that the fuel is delivered thereto in a properly atomized state for injection into the combustion space of the engine as the valve opens. Thus, the improved spray valve, when used in a horizontal or any inclined position, has all the advantages heretofore obtained only in a spray valve designed for use with its longitudinal axis in a true vertical position.

To enable a full understanding of the invention to be had, a detailed description of a valve embodying the invention in preferred and modified forms will now be given in connection with the accompanying drawings, and the features forming the invention then be specifically pointed out in the claims.

In the drawings—

Figure 1 is a longitudinal section of one preferred embodiment of the invention mounted on a cylinder extension;

Figure 2 is an enlarged section on the line 2—2 of Fig. 1, with the cylinder extension omitted;

Figure 3 is a partial view similar to Fig. 1, showing a modified construction,

Figure 4 is an enlarged section on the line 4—4 of Fig. 3, with the cylinder extension omitted.

Figure 5 is a view similar to Fig. 3, showing another modification.

Referring now to the drawings, and particularly to Figs. 1 and 2, the spray valve casing 20 is shown as mounted in a cylinder extension A. Positioned centrally within the valve casing 20 is a valve spindle 21 carrying at one end a conical valve plug 22 arranged to co-operate with an inclined seat which, in the present showing, is formed directly on the casing 20. At its opposite end the spindle 21 passes through a stuffing box 23 of usual construction, and on the portion outside thereof is encircled by a compression spring 24 taking against collars 25, 26, so as to normally hold the valve closed, the valve being shown as opened against the spring 24 by the usual lever D.

To insure equal distribution of the oil to the jet orifices in the spray nozzle, irrespective of the position of the spray valve, there is provided a member 1 which, for convenience in manufacture, may be, as shown, an extension formed on the stuffing box 23. This member 1 surrounds the valve spindle 21 and is secured in proper position by threaded engagement with a nozzle tip 2 positioned within the casing 20. In the nozzle tip 2 there are formed the usual ducts or jet orifices 3, which in the present showing converge toward their outlets, and preferably lie approximately parallel with the outer wall of the conical nozzle tip, the oil entering the ducts 3 from annular ducts or chamber 1. The member 1, also, is shown as of approximately rectangular shape in cross-section (Fig. 2), but obviously may be of any other shape which will provide either an annular chamber or series of longitudinal passages 5, when enclosed in a cylindrical member such as 6. This latter member is properly positioned with respect to the valve casing 20 and the member 1 by providing an enlargement on the end thereof, in which are formed inclined passages 7 communicating with an annular chamber 8, preferably formed by reducing the diameter of the enlarged end of the member 6, the pump supplying oil to such chamber through connection B. The annular chamber 9 thus formed between the member 6 and the casing 20 receives the pressure air through the connection C. Abutting against the nozzle tip 2 is the atomizer ring shown as formed of a plurality of superposed circular plates 11, in which peripheral openings 12 are formed in staggered relation to each other.

Referring again to the above Figures 1 and 2, and to the means for securing the proper distribution of the oil to the atomizing ring, or to the jet orifices if no atomizer ring be used, there is provided between the plates 11 and member 6 a circular member 13, having a concave peripheral surface 14, to which oil is supplied under pressure through a tangential passage or passages 5, and a whirling motion of the body of oil around the member 13, in the groove 14, thus maintained. Only one tangential passage 15 is shown, and this usually will be found preferable, but it will be understood that any number of such passages may be used as desired. Such whirling motion, according to the present showing, is of course in a plane at right angles to the longitudinal axis of the spray valve, and generates a centrifugal force which will hold the oil up against the action of gravity and evenly distribute it over the openings 12 in the plates 11, although the valve be horizontal. Air entering through connection C will therefore be substantially evenly applied to the rear surface of the whirling body of oil, that is, the surface farthest from the spray nozzle, so that the air behind the body of oil drives it toward the spray nozzle, and as the oil moves through the atomizing ring such air will be intimately commingled with the oil as it reaches the annular chamber 4, from which it passes to all of the jet orifices or ducts 3 for delivery to the combustion space of the engine when the valve 22 opens. The concave groove 14 forms a chamber which aids in retaining the whirling body of oil in position for the action of the air thereon, which delivers the oil from the groove in a thin film past the edge of the grooved member 13.

In the modified spray valve construction shown in Fig. 3, the oil is admitted first to the annular chamber 16 and pressure air to a similar chamber 17. The oil then passes to the annular groove 18, formed in an enlargement on the end of a cylindrical member 19. Due to the tangential position of the passage 15 leading into chamber 18 from chamber 16 (Fig. 4), the whirling motion of the body of oil, described with reference to Fig. 1, results, with a similar generation of centrifugal force sufficient to maintain such whirling body of oil evenly distributed throughout the space 18, irrespective of the longitudinal position of the spray valve. Thus, as pressure air is admitted to chamber 17, a substantially uniform pressure of air will be applied over all the rear surface of the whirling body of oil and the latter be forced through the atomizer, where the air will be commingled with the oil and the fuel delivered in a finely atomized state to all of the ducts 3 for injection into the combustion space of the engine when the valve 22 opens.

Referring to the modification of Fig. 5, the construction shown simplifies the arrangements of Figs. 1 and 3 by eliminating the members 6 and 19, respectively, of such figures. As shown in this modification the oil passage is formed directly in the guide sleeve 1ª for the valve spindle 21, the wall of such sleeve preferably being thickened at such point for this purpose, and such guide sleeve extending to and having threaded engagement with the nozzle tip as shown in Fig. 1. The passage 27, according to the present modification, conducts the oil to an annular chamber 28, which preferably is formed in a circular member 29 mounted on a reduced extension of guide sleeve 1ª. This chamber 28 may be conveniently closed on one side, except at the point where the passage 27 enters it, by an annular enlargement or head 30, the latter also serving to hold the member 29 firmly against the bottom of the cup-like member 31, the outer wall of which snugly fits the bore in the valve casing 20. The inner side wall of the member 31 preferably and as shown is slightly concaved, thus providing an annular chamber 32 to which the oil from chamber 28 is delivered by tangential passages 33. As in the case of Figs. 1 and 3, the tangential arrangement of these passages 33 imparts a whirling motion to the oil within the annular chamber 32, so that the oil is evenly distributed with respect to the orifices 34, irrespective of the longitudinal position of the spray valve. Thus, as pressure air is admitted to the annular space 35, a substantially uniform air pressure is applied over the whole rear surface of the whirling body of oil within the chamber 32, and the oil thereby forced through all of the orifices 34, and thence to the atomizer and combustion space, as above described.

It will be understood that the invention is not to be limited to the particular type of spray valve shown, but that it may be used with other types of spray valves, and that modifications may be made in the means for distributing the oil in a uniform body for the action of the air, while still retaining the invention defined by the claims.

What I claim is:

1. A spray valve, comprising a casing having an annular chamber therein, a tangential passage communicating with said chamber, an oil pump connection to said passage, said pump and passage being arranged to supply a body of oil to said chamber and impart to said body of oil a whirling motion in a plane transverse to the longitudinal axis of the valve casing, an annular passage in line with said annular chamber, and means for applying air under pressure over the rear surface of said whirling body of oil to conduct it through said passage to the combustion space of the engine.

2. A spray valve, comprising a casing having an annular chamber therein, a tangential passage communicating with said chamber, an oil pump connection to said passage, said pump and passage being arranged to supply a solid body of oil to said chamber and impart to said body of oil a whirling motion in a plane transverse to the longitudinal axis of the valve casing, an annular passage in line with said annular chamber, an air connection to said chamber arranged to apply a substantially uniform air pressure over the rear surface of said whirling body of oil, means in said annular passage for atomizing said oil, and means for conducting said atomized fuel through said passage to the combustion space of the engine.

3. A spray valve, comprising a casing having an annular chamber therein, a passage communicating with said chamber and an oil supply connection to said passage, said passage and oil connection being arranged to provide a solid body of oil within said chamber and impart to said body of oil therein a whirling motion in a plane transverse to the longitudinal axis of said valve, a spray nozzle having a plurality of annularly arranged ducts accessible to said whirling body of oil, an annular passage in line with said chamber and nozzle and means for applying air under pressure over the rear surface of said whirling body of oil to conduct it through said annular passage and ducts into the combustion space of of the engine.

4. A spray valve, comprising a casing, having an annular chamber therein, a passage communicating with said chamber and an oil supply connection to said passage, said passage and oil connection being arranged to provide a solid body of oil within said chamber and impart to said body of oil therein a whirling motion in a plane transverse to the longitudinal axis of said casing, a spray nozzle having a plurality of annularly arranged ducts accessible to said whirling body of oil, an annular passage in line with said chamber and nozzle, means for applying air under pressure over the rear surface of said whirling body of oil to conduct it through said annular passage and ducts into the combustion space of the engine, and means for atomizing said oil.

5. A spray valve, comprising a casing, a chamber within said casing, a member within said casing having an annular groove lying in a plane transverse to the longitudinal axis of the valve casing, means for delivering oil under pressure to said chamber to produce a whirling body of oil rotating within the groove of said grooved member, an annular passage in line with said annular chamber, and means for applying a substantially uniform air pressure over the rear surface of said whirling body of oil to conduct it through said passage into the combustion space of the engine.

6. A spray valve, comprising a casing, a chamber within said casing, a member within said chamber having an annular groove therein lying in a plane transverse to the longitudinal axis of the valve casing, means for tangentially delivering oil under pressure to said groove to thereby produce a whirling body of oil rotating in the plane of said groove, a spray nozzle having a plurality of ducts accessible to said whirling body of oil, an annular passage in line with said chamber and nozzle, and means for applying air under pressure over the rear surface of said whirling body of oil to conduct it through said annular passage and ducts into the combustion space of the engine.

7. A spray valve, comprising a casing, a chamber within said casing, a member within said chamber having an annular groove therein lying in a plane transverse to the longitudinal axis of the valve casing, means for tangentially delivering oil under pressure to said groove to thereby produce a body of oil rotating in the plane of said groove, a spray nozzle having a plurality of ducts accessible to said whirling body of oil, an annular passage in line with said annular chamber, means for applying a substantially uniform air pressure over the rear surface of said whirling body of oil to conduct it through said passage ducts into the combustion space of the engine, and means for atomizing said oil in its passage to said combustion space.

In testimony whereof, I have hereunto set my hand.

OLAV ESKIL JORGENSEN.